Patented Feb. 20, 1945

2,369,776

UNITED STATES PATENT OFFICE 2,369,776

NITROGENOUS ORGANIC COMPOUNDS AND THEIR APPLICATION

Noel William Cusa, Charles Edward Salkeld, and Eric Everard Walker, Blackley, Manchester, England, assignors to Imperial Chemical Industries Limited, a corporation of Great Britain No Drawing. Application June 28, 1938, Serial No. 216,398. In Great Britain June 30, 1937

17 Claims. (Cl. 260—295)

This invention relates to the manufacture of new nitrogenous organic compounds and to their application in textile treatment.

According to the invention we cause to interact together a fatty-acyl urea or a fatty-alkyl urea or a fatty-alkyl carbamate or allophanate, and formaldehyde or a substance yielding formaldehyde, and a tertiary amine salt or an addition compound of a tertiary amine with an inorganic acid anhydride.

The term fatty-acyl is intended to signify that the radical so described is the radical of a higher fatty acid, i. e. of such an acid as can be obtained from natural sources by saponification of oils and fats. The term fatty-alkyl relates correspondingly to the radicals of the alcohols obtainable by reduction of the carboxyl group of the said fatty acids, which also and correspondingly may be saturated or unsaturated.

Derivatives of the ureas, carbamates and allophanates mentioned may be used so long as the molecule of the compound contains at least one amino (—NH₂) group.

Among the tertiary amine salts suitable for use according to the invention are pyridine hydrochloride, trimethylamine hydrobromide, pyridine m-nitrobenzene sulphonate, and quinoline hydrochloride, and suitable tertiary amine addition compounds are the addition compounds of pyridine wtih sulphur trioxide and sulphur dioxide. A mixture of a tertiary amine salt and a tertiary amine addition compound such as is produced for example by the reaction of chlorsulphonic acid on pyridine (see Baumgarten, Berichte der deutschen Chemischen Gesellschaft, 1926, 59, 1160–1169) may also be used. The reaction may also be carried out by dissolving the urea derivative or other compound mentioned and the formaldehyde or the urea-formaldehyde condensation product in pyridine and passing sulphur dioxide gas into the warm solution.

The interaction may be by stages, that is, as is indicated above, the fatty acyl or fatty alkyl urea or other compound mentioned may be caused to interact with the formaldehyde or formaldehyde yielding substance, and the product of that reaction may then be brought into reaction with the tertiary amine compound.

The new compounds obtained according to the invention are believed to be quaternary ammonium salts. They are solids which may be crystallised from acetone or other organic solvent. They dissolve in water to give foaming solutions. When these solutions are heated for some time decomposition of the dissolved compound takes place, a precipitate is formed and the liquid ceases to foam.

By a further feature of the invention the new compounds are applied to fabricated sheet-like, fabricated thread-like, or fibrous materials of vegetable or animal origin, to confer on those materials properties of softness and/or water-repellency which are resistant to laundering and dry-cleaning treatments.

This feature of the invention is carried into effect by impregnating the said materials with a solution or suspension of one or more of the new compounds in water or a suitable organic liquid, and subsequently submitting the impregnated material to a heat treatment. Where a hydroxylic solvent or carrying fluid is used, for example, water or alcohol, it is preferable to dry the impregnated material before subjecting it to the heat treatment.

The conditions for carrying out the treatment vary according to the nature of the material to be treated, the nature and concentration of the impregnating solution and the kind of finish desired. Thus, soft finishes are obtained when the impregnating solution contains about 0.2% of the treatment agent and highly water-repellent finishes when it contains about 1% of the agent. In general the effect is conveniently obtained by drying the impregnated materials at a temperature of between 30° C. and 50° C. and subsequently heating the dried material for a short time at a temperature lying between 90° C. and 160° C., but temperatures outside these ranges may also be used provided that other conditions (e. g. circulation of air around and through the fabric) are suitably adjusted.

The drying temperature is preferably kept low in order that there may be no premature decomposition of the quaternary salt. Temperature of drying is, however, a less important factor than speed and other conditions of drying. Thus, for instance, an impregnated fabric which is to be dried in more or less stagnant air, as in an oven which is not provided with artificial air circulation, should preferably not be submitted to a drying temperature of more than 30° C. since under these conditions the higher the temperature at this stage, the more the intensity of the ultimate water-repellent effect tends to diminish. When, on the other hand, the impregnated material is dried in a brisk current of hot air so that the water is removed rapidly (for example in 1 to 3 minutes) then a drying temperature as high as 80° C. may be used without disadvantage. The nature of the material also must be considered; a material of an open weave can be dried more rapidly and therefore may safely be dried at a higher temperature than a closely woven one.

The subsequent heat treatment at a higher temperature, conveniently referred to as the "baking" treatment, is designed to bring about the decomposition of the quaternary salt which has been deposited on the fibre. The baking step is essential if the water-repellent properties conferred on the fabric by the treatment are to be resistant to laundering and dry cleaning operations. For this purpose temperatures lying between 90° and 200° C. are suitable. The time of baking varies with the temperature used; with higher temperatures shorter baking times suffice. For example, for materials such as cotton limbric suitable times and temperatures are 30 minutes at 100° C., 10 minutes at 130° C., 1½ minutes at 160° C. The time of baking is preferably kept as short as possible to avoid tendering of the fabric.

It is also possible, if the fabric is of an open weave and provision is made for a brisk circulation of air around and through the fabric, to omit the drying step indicated and to heat the wet material directly to the baking temperature.

To prevent or minimise tendering when cellulose material is treated with a quaternary salt of a strong acid, the impregnating solution or suspension may contain also an alkaline substance or a substance that has a buffering action; alternatively the alkaline substance or buffering agent may be applied to the fabric independently, either before or after the impregnation with the quaternary salt. Suitable substances are, for example, pyridine, hexamethylene tetramine, ammonium or alkali metal or alkaline earth metal salts of weak acids for example ammonium acetate, sodium acetate or borax.

When aqueous impregnating solutions or suspensions are used it is advantageous to assist the penetration of the fabric by the impregnating liquor by adding to the latter a small proportion of a water-soluble organic liquid, for example, methyl or ethyl alcohol or acetone.

Known textile finishing agents may as desired be applied in conjunction with the said new quaternary salts to give a fuller or more stiff handle to the fabrics. Thus, for instance, there may be used aluminium salts such as aluminium acetate or formate, cellulose derivatives such as methyl, ethyl or glycol cellulose, gums or glues such as carragheen moss or gum tragacanth, resins or resin intermediates such as condensation products of urea and formaldehyde or phenol and formaldehyde, waxes or fatty substances (which may be applied from solution in an organic liquid or in the form of suspension) such as paraffin wax, Japan wax, montan wax, carnauba wax, aluminium salts of higher fatty acids (e. g. stearic acid), esters or amides of higher fatty acids.

By a further feature of the invention the new quaternary salts may also be applied in conjunction with compounds which are used to confer crease-resistant properties on textile materials, for example condensation products of formaldehyde with phenols, or with urea or urea derivatives, the two treatment agents being applied either separately or simultaneously, i. e. from the same bath. There are thus produced soft, water-repellent, crease-resistant fabrics.

The new compounds may also be used in the resist printing of textiles. In this case the quaternary salt is incorporated in the resist printing paste and the fabric is printed in the usual way. It is then steamed, whereby the quaternary salt is decomposed and there are produced water-repellent areas on the fabric which are not dyed when the ground colour is subsequently applied. If there is also incorporated in the printing paste an ice color preparation capable of being developed by treatment with an acid, and the steaming operation is modified in that it is carried out in presence of the vapour of a suitable acid, e. g. formic or acetic acid, there are finally produced illuminated resists, consisting of coloured patterns on a differently coloured ground. As dyestuffs to be used in producing the ground shade there may be used vat dyestuffs (applied either as such from an alkaline reduction medium or in the soluble leuco ester form), azoic colours (applied for instance in the form of stabilised preparations containing both diazoamino compound and coupling component) or mordant dyestuffs.

The new compounds are believed to be quaternary salts of the formula—

Y—CO—NH—CH$_2$—N(tert)—X wherein Y stands for any one of the groups R—CO—NH—, R—NR'—, R—O—, or

R—O—CO—NH—

R being the hydrocarbon radical (saturated or unsaturated) of a higher fatty acid and R' being hydrogen or an alkyl radical; N(tert) stands for the molecule of a tertiary amine and X stands for the monovalent anion of a salt-forming acid.

The invention is illustrated but not limited by the following examples in which, unless otherwise stated, the parts are by weight.

*Example 1*

To 130 parts of dry pyridine, 11 parts of dry (gaseous) hydrogen chloride are added. 7.5 parts of paraformaldehyde and 138.5 parts of stearyl urea (Stendal, Comptes rendus . . . de l'Academie des Sciences 1933, 196, 1810) are then added and the mixture is stirred and heated at 70–75° C. until, after about 18 hours, a test sample gives a clear solution in warm water. The mixture is then cooled and acetone is added whereby the new compound is precipitated in colourless, hygroscopic, crystals. It is readily soluble in water at 60–70° C. to give a clear foaming solution. When this solution is kept hot decomposition takes place, a precipitate is formed and the power to produce foaming is lost.

The compound seemingly has the formula

C$_{17}$H$_{35}$—CO—NH—CO—NH—CH$_2$—NC$_5$H$_5$—Cl

*Example 2*

8.2 parts of dry hydrogen chloride are passed into 90 parts of dry pyridine. 5.2 parts of paraformaldehyde and 20 parts of lauryl urea (made from lauryl chloride and urea) are added and the mixture is stirred and heated at 70–75° C. until, after about 18 hours, a test sample gives a clear solution in warm water. The mixture is then cooled and diluted with ether, whereby the new compound is precipitated in the form of colourless crystals. It dissolves readily in warm water to give a clear, foaming solution. When this solution is boiled the compound slowly decomposes, a precipitate is formed and the power to produce foaming is lost.

The compound seemingly has the formula

C$_{11}$H$_{23}$—CO—NH—CO—NH—CH$_2$—NC$_5$H$_5$—Cl

Example 3

To 130 parts of dry pyridine, 11 parts of dry hydrogen chloride are added. 7.5 parts of paraformaldehyde and 35 parts of N-heptadecylurea are then added and the mixture is stirred and heated at 60–65° C. for 1 hour, after which period a test portion gives a clear, foaming solution in warm water. The reaction mixture is then cooled and ether is added whereby the new compound is precipitated in colourless, very hygroscopic crystals. The product resembles in behaviour that of Example 1.

The compound seemingly has the formula $C_{17}H_{35}$—NH—CO—NH—CH$_2$—NC$_5$H$_5$—Cl

Example 4

3.1 parts of dry gaseous hydrogen chloride are passed into 30 parts of dry pyridine. 2 parts of paraformaldehyde and 8.7 parts of N-cetyl-N-methylurea of the formula

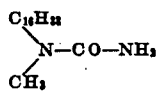

(made from nitrourea and cetylmethylamine) are then added and the mixture is stirred and heated at 65–70° C. until, after about 1 hour, a test portion gives a clear solution in warm water. The mixture is then cooled, whereupon it separates into two layers. The lower layer is rejected. The upper layer is diluted with acetone and ether, whereby the new quaternary salt is precipitated in the form of a soft, very hygroscopic solid. It dissolves readily in warm water to give a clear foaming solution. When this solution is boiled the salt slowly decomposes and the power to produce foaming is lost.

The compound seemingly has the formula

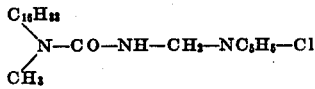

Example 5

11 parts of heptadecylurea, 50 parts of benzene, 1.6 parts of paraformaldehyde and 3.5 parts of anhydrous potassium carbonate are mixed. The mixture is heated and stirred at 50–60° C. for 2 hours. It is then cooled and the benzene is removed by evaporation. The residue is washed free from potassium carbonate by means of warm water and is then ground up with acetone and filtered. The residue (methylol heptadecylurea), is a white powder, M. P. 130° C., which gives off formaldehyde when strongly heated.

To 50 parts of pyridine 3.5 parts of dry hydrogen chloride are added. 10 parts of methylol heptadecylurea are then added and this mixture is stirred at 60–65° C. until, after about one hour, a test sample gives a clear solution in warm water. The product is isolated in the way described in Example 2.

The compound seemingly has the formula $C_{17}H_{35}$—NH—CO—NH—CH$_2$—NC$_5$H$_5$—Cl

Example 6

To 250 parts of pyridine 23 parts of dry hydrogen chloride are added. 72 parts of octadecylcarbamate (see German Patent Specification 565,319) and 15 parts of paraformaldehyde are added and the mixture is stirred and heated at 70° C. until a test sample of the reaction mixture gives a clear solution in water. The reaction mixture is cooled and ether is added whereby the new compound is precipitated in colourless crystals. This compound also resembles in behaviour the product of Example 1.

The compound seemingly has the formula $C_{18}H_{37}$—O—CO—NH—CH$_2$—NC$_5$H$_5$—Cl

Example 7

4 parts of sodium pyrosulphate and 25 parts of dry pyridine are stirred together at 95–100° C. for ½ hour. The mixture is then cooled, and 4 parts of octadecyl carbamate and 1.8 parts of paraformaldehyde are added. The mixture is then stirred and heated at 70–75° C. for 18 hours. It now consists of a clear solution and a sludge or sediment. The clear solution is decanted from the sludge, cooled and diluted with acetone whereby the new compound is precipitated in the form of colourless crystals. It is sparingly soluble in hot water. If the aqueous solution is boiled the compound rapidly decomposes and a precipitate is formed.

The compound seemingly has the formula

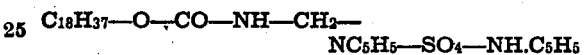

Example 8

21 parts of octadecyl carbamate, 8 parts of paraformaldehyde and 80 parts of dry pyridine are stirred and heated together at 90° C. and a rapid stream of sulphur dioxide is passed through the mixture. Reaction takes place with evolution of heat, and the heating and passage of gas is continued until, after about 15 minutes, a test portion gives a clear solution in warm water. The mixture is then cooled and acetone is added, whereby the new quaternary salt is precipitated in the form of a soft waxy solid. It is readily soluble in hot water to give a clear foaming solution. If this solution is boiled the compound rapidly decomposes, a precipitate is formed and the power to produce foaming is lost.

The compound seemingly is a carbo-octadecyl-oxyaminomethylpyridinium salt.

Example 9

1.8 parts of dry hydrogen chloride are added to 25 parts of dry pyridine, 1.3 parts of paraformaldehyde and 4 parts of dodecyl carbamate (made from urea and dodecyl alcohol) are added and the mixture is stirred and heated at 70° C. until, after about 2 hours, a test sample gives a clear solution in warm water. The mixture is then cooled and diluted with ether, whereby the new compound is precipitated in the form of colourless crystals. It dissolves readily in water to give a clear foaming solution. When this solution is boiled the compound is rapidly decomposed, a precipitate is formed and the power to produce foaming is lost.

The compound seemingly has the formula $C_{12}H_{25}$—O—CO—NH—CH$_2$—NC$_5$H$_5$—Cl

Example 10

30 parts of octadecyl carbamate, 3.1 parts of paraformaldehyde and 7 parts of potassium carbonate are mixed with 100 parts of benzene and the mixture is stirred and heated at 50° C. for 2 hours. The mixture is then cooled and the benzene is removed by evaporation. The residue is washed with warm water to free it from potassium carbonate and is then recrystallised from acetone. There is thus obtained methylol octadecyl carbamate in the form of a white powder, M. P. 82° C.

3.5 parts of dry hydrogen chloride are passed into 50 parts of dry pyridine. 10 parts of methylol octadecyl carbamate are then added and the mixture is stirred and heated at 65–70° C. until, after about 30 minutes, a test portion gives a clear solution in warm water. The product is isolated as described in Example 4. It resembles in behaviour the product of Example 6.

The compound seemingly has the formula

C₁₈H₃₇—O—CO—NH—CH₂—NC₅H₅—Cl

Example 11

6.8 parts of pyridine nitrate, 5 parts of methylol octadecyl carbamate and 25 parts of dry pyridine are stirred and heated together at 70–75° C. for 18 hours. The mixture is then cooled and diluted with ether, whereby the new compound is precipitated in the form of colourless crystals. It dissolves readily in hot water to give a clear foaming solution, and decomposes immediately the solution is boiled.

The compound seemingly has the formula

C₁₈H₃₇—O—CO—NH—CH₂—NC₅H₅—NO₃

Example 12

22 parts of dodecyl carbamate, 3.1 parts of paraformaldehyde, 7 parts of potassium carbonate and 100 parts of benzene are stirred and heated together at 50° C. for 2 hours. The mixture is then cooled and the benzene is removed by evaporation. The residue is washed with warm water to free it from potassium carbonate and is then recrystallised from acetone. There is thus obtained methylol dodecyl carbamate in the form of a white powder, M. P. 80° C.

1.8 parts of dry hydrogen chloride are passed into 25 parts of dry pyridine. 4.3 parts of methylol dodecyl carbamate are added and the mixture is stirred and heated at 70° C. until, after a short time, a test sample gives a clear solution in water. The product is isolated in the manner described in the preceding example. It resembles in behaviour the product of Example 9.

The compound seemingly has the formula

C₁₂H₂₅—O—CO—NH—CH₂—NC₅H₅—Cl

Example 13

1.6 parts of dry hydrogen chloride are passed into 30 parts of quinoline. 5 parts of methylol octadecyl carbamate are then added and the mixture is stirred and heated at 70–75° C. for 2 hours. The mixture is cooled and diluted with ether, whereupon a tarry product is precipitated. This is separated off and dissolved in chloroform. The chloroform solution is filtered and is then diluted with ether whereby the new compound is precipitated in the form of a dark red, viscous oil. It dissolves in hot water to give a strongly foaming solution and decomposes rapidly if the solution is boiled.

The compound seemingly has the formula

C₁₈H₃₇—O—CO—NH—CH₂—NC₉H₇—Cl

Example 14

2.2 parts of dry hydrogen chloride are passed into 50 parts of dry pyridine. 1.4 parts of paraformaldehyde and 7 parts of octadecyl allophanate (made from urea and octadecyl chloroformate) are then added and the mixture is stirred and heated at 70–75° C. for 48 hours. The mixture is then cooled and diluted with ether, whereby the new quaternary compound is precipitated in the form of colourless crystals. It dissolves in warm water to give a clear, foaming solution. When this aqueous solution is boiled the quaternary salt slowly decomposes, a precipitate is formed and the power to produce foaming is lost.

The compound seemingly has the formula

C₁₈H₃₇—O—CO—NH—CO—NH—
CH₂—NC₅H₅—Cl

Example 15

A viscose artificial silk material is soaked at 35° C. in a solution containing 10 parts of the product of Example 6 in 1000 parts of water. The material is squeezed so that it contains its own weight of impregnating solution and is then dried in a current of warm air at 40° C. The dry material is heated for 5 minutes at 120° C.

The treated fabric is water-repellent and has a very pleasing soft handle and much improved draping properties. Dry cleaning or laundering of the material does not cause these properties to disappear.

Example 16

Cotton sheeting is soaked at room temperature in a mixture of 5 parts of the product of Example 1 and 1000 parts of water. The material is squeezed to remove excess liquor from the cloth and is dried in a current of warm air at 40° C. The dried fabric is heated for 5 minutes at 120° C.

The treated cotton sheeting is water-repellent and has a soft suede-like handle. These properties survive laundering and dry cleaning.

Example 17

A natural silk fabric is passed at room temperature through a mixture of 10 parts of stearylureidomethylpyridinium chloride and 1000 parts of water. The material is wrung until it contains its own weight of moisture and is dried in a current of warm air at 40° C. The dry, impregnated material is heated for 10 minutes at 110° C.

The material is now water-repellent and possesses a very pleasing soft handle and much improved draping properties. These properties survive laundering and dry cleaning.

Example 18

A wool gaberdine fabric is passed at 55° C. through a solution containing 2 parts of carbo-octadecyloxyaminomethylpyridinium nitrate in 98 parts of water. The fabric is squeezed so that it contains its own weight of impregnating solution and is dried in a brisk current of warm air at 50° C. The dry fabric is then heated for 2½ minutes at 150° C. Finally it is washed for a few minutes at 45° C. in a solution containing 2 parts of soap and 1 part of concentrated ammonia solution (Sp. Gr. 0.880) in 1000 parts of water, well rinsed in warm water and dried.

The material now has a very soft pleasing handle and is highly water-repellent. These properties are not destroyed by washing or dry cleaning treatments.

Example 19

A printed viscose fabric is impregnated at 50° C. with a solution containing 0.5 part of sodium acetate in 100 parts of water. The fabric is squeezed so that it contains its own weight of impregnating solution and is then dried. The dry fabric is passed at room temperature through a solution containing 2 parts of the carbo-octadecyloxy-aminomethylpyridinium salt (made as described in Example 8) dissolved in a mixture of 93 parts by volume of benzene and 7 parts by volume of ethyl alcohol. The fabric is squeezed to remove the excess of impregnating solution, freed from solvent by drying in a current of warm air at 40° C. and then heated for 1½ minutes at 160° C. The fabric is then washed for a few minutes at 40° C. in a solution containing 1 part of soap and 1 part of concentrated ammonia solution (Sp. Gr. 0.880) in 1000 parts of water, well rinsed in warm water and dried.

It is now highly water-repellent and possesses a pleasing soft handle and remarkable draping properties. These properties survive laundering and dry cleaning operations.

*Example 20*

A solution is made by dissolving 100 parts of urea in 200 parts of neutralised aqueous formaldehyde solution (40%), to which is added 7.5 parts of concentrated ammonia solution (Sp. Gr. 0.880). The mixture is boiled for a few minutes and then rapidly cooled to room temperature. There are now added 6 parts of ammonium dihydrogen phosphate and 8 parts of stearylureidomethylpyridinium chloride in the form of an aqueous suspension in 50 parts of cold water and the mixture is diluted to a total volume of 400 parts by addition of cold water.

Cotton sheeting is padded in the above solution at room temperature and is then squeezed so that it contains its own weight of impregnating solution. It is then dried in a current of warm air at 40°–50° C. The dry fabric is heated for 2½ minutes at 150° C. Finally it is washed for a few minutes at 45° C. in a solution containing 2 parts of soap and 1 part of anhydrous sodium carbonate in 1000 parts of water, well rinsed in warm water and dried.

The fabric now has a remarkably soft handle, is highly water-repellent and is crease-resistant. These properties survive washing and dry cleaning treatments.

*Example 21*

Cotton sheeting is padded at 40° C. in a suspension containing 2 parts of carbo-octadecyloxy-ureidomethylpyridinium chloride (made as described in Example 14) in 98 parts of water. The fabric is squeezed so that it contains its own weight of impregnating solution and is then dried in a brisk current of warm air at 50°–60° C. The dry fabric is now heated for 2½ minutes at 150° C. Finally it is washed for a few minutes at 50° C. in a solution containing 1 part of soap and 1 part of anhydrous sodium carbonate in 1000 parts of water, well rinsed in warm water and dried.

It is now water-repellent and possesses a soft handle. These properties are not readily destroyed by washing or dry cleaning operations.

We claim:

1. A process for the manufacture of quaternary nitrogenous organic compounds, which comprises reacting an organic compound of the general formula $Z-CONH_2$, as hereinbelow defined, with a reagent yielding formaldehyde and a nitrogenous compound of the group consisting of salts of tertiary bases and addition compounds of tertiary bases with inorganic acid anhydrides; Z in the above formula being a radical of the group consisting of $R-O-$, $R-NH-$, $R-NR'-$, $R-CONH-$, and $R-OCONH-$, wherein R is an aliphatic radical comprising a chain of at least 8 carbon atoms while R' is a lower alkyl radical.

2. A process for the manufacture of quaternary nitrogenous organic compounds, which comprises reacting an organic compound of the general formula $Z-CONH_2$, as hereinbelow defined, with an alkaline agent and a reagent yielding formaldehyde in an organic liquid medium to give an intermediate methylol compound of the general formula $Z-CONH-CH_2OH$, and then reacting said methylol compound with a nitrogenous compound selected from the group consisting of salts of tertiary bases and addition compounds of tertiary bases with inorganic acid anhydrides; Z in the above formulas being a radical of the group consisting of $R-O-$, $R-NH-$, $R-NR'-$, $R-CONH-$, and $R-OCONH-$, wherein R is an aliphatic radical comprising a chain of at least 8 carbon atoms, while R' is a lower alkyl radical.

3. In the process of producing a quaternary nitrogenous organic compound, the step of reacting together a methylol compound of the general formula $Z-CONH-CH_2OH$, as hereinbelow defined, with a nitrogenous compound of the group consisting of salts of tertiary bases and addition compounds of tertiary bases with inorganic acid anhydrides; Z in the above formula being a radical of the group consisting of $R-O-$, $R-NH-$, $R-NR'-$, $R-CONH-$, and $$R-OCONH-$$

wherein R is an aliphatic radical comprising a chain of at least 8 carbon atoms, while R' is a lower alkyl radical.

4. A process for the manufacture of quaternary nitrogenous organic compounds, which comprises reacting a higher fatty acyl urea of formula $Alk-CONH-CONH_2$, wherein Alk is an alkyl radical of at least 8 carbon atoms, with paraformaldehyde and a pyridine salt in an excess of pyridine.

5. A process for the manufacture of quaternary nitrogenous organic compounds, which comprises reacting a higher fatty alkyl urea of formula $Alk-NH-CONH_2$, wherein Alk is an alkyl radical of at least 8 carbon atoms, with paraformaldehyde and a pyridine salt in an excess of pyridine.

6. A process for the manufacture of quaternary nitrogenous organic compounds, which comprises reacting a higher fatty alkyl carbamate of formula $Alk-O-CONH_2$, wherein Alk is an alkyl radical of at least 8 carbon atoms, with paraformaldehyde and a pyridine salt in an excess of pyridine.

7. A compound of the general formula $$Z-CONH-CH_2-N(tert)-X$$

wherein N(tert) stands for a tertiary organic base, X stands for the anion of a salt-forming acid, and Z stands for a radical of the group consisting of $R-O-$, $R-NH-$, $R-NR'-$, $$R-CONH-$$

$R-OCONH-$, wherein R is an aliphatic radical comprising a chain of at least 8 carbon atoms, while R' is a lower alkyl radical.

8. A compound of the general formula $$Z-CONH-CH_2-N-X$$

wherein X stands for the anion of a salt-forming acid, and Z stands for a radical of the group consisting of $R-O-$, $R-NH-$, $R-NR'-$, $R-CONH-$, $R-OCONH-$, wherein R is an aliphatic radical comprising a chain of at least 8 carbon atoms, while R' is a lower alkyl radical.

9. Stearyl-uriedo-methyl-pyridinium chloride.

10. N-heptadecyl - ureido - methyl - pyridinium chloride, being a compound of the formula

11. Octadecyloxy-formamido-methyl - pyridinium chloride.

12. A compound of the general formula

Z—CONH—CH₂—N(tert)—Halogen wherein N(tert) stands for a tertiary organic base, and Z stands for a radical of the group consisting of R—O—, R—NH—, R—NR'—, R—CONH—, R—OCONH—, wherein R is an aliphatic radical comprising a chain of at least 10 carbon atoms, while R' is a lower alkyl radical.

13. A compound of the general formula

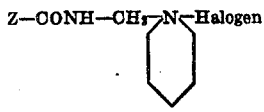

wherein Z stands for a radical of the group consisting of R—O—, R—NH, R—NR'—,

R—CONH—

R—OCONH—, wherein R is an aliphatic radical comprising a chain of at least 10 carbon atoms, while R' is a lower alkyl radical.

14. A compound containing a radical of a carbamate derivative and having the formula R.OCO.NH.CH₂.N(tert).Halogen wherein R stands for an aliphatic radical containing at least 10 carbon atoms, and N(tert) stands for a tertiary amine.

15. A compound containing a radical of a urea derivative and having the formula

R.CO.NH.CO.NH.CH₂.N(tert).Halogen wherein R stands for an aliphatic radical containing at least 10 carbon atoms, and N(tert) stands for a tertiary amine.

16. A process of the kind described which comprises reacting a substituted urea of the formula R.NH.CO.NH₂, wherein R is an aliphatic radical containing at least 10 carbon atoms, with formaldehyde, a halogen acid, and a tertiary amine to produce the quaternary ammonium salt of the methyl halide derivative of the urea.

17. A process of the kind described which comprises reacting a urethane of the formula R.O.CO.NH₂, wherein R is an aliphatic radical containing at least 10 carbon atoms, with formaldehyde, a halogen acid, and a tertiary amine to produce the quaternary ammonium salt of the methyl halide derivative of the urethane.

NOEL WILLIAM CUSA.
CHARLES EDWARD SALKELD.
ERIC EVERARD WALKER.